United States Patent [19]

Edwards

[11] Patent Number: 4,983,308

[45] Date of Patent: Jan. 8, 1991

[54] AUTOMATIC CHEMICAL CLEANING OF GRANULAR MEDIUM FILTERS

[75] Inventor: Ronald L. Edwards, Wausau, Wis.

[73] Assignee: Zimpro/Passavant Inc., Rothschild, Wis.

[21] Appl. No.: 452,454

[22] Filed: Dec. 18, 1989

[51] Int. Cl.$^5$ .............................................. B01D 24/46
[52] U.S. Cl. ..................... 210/794; 210/108
[58] Field of Search ................. 134/18, 25.1; 210/108, 210/792–796

[56] References Cited

U.S. PATENT DOCUMENTS

| | | | |
|---|---|---|---|
| 3,932,278 | 1/1976 | Meidl et al. | 210/80 |
| 4,032,443 | 6/1977 | Ross | 210/82 |
| 4,580,448 | 4/1986 | Skrgatic | 73/290 V |
| 4,617,131 | 10/1986 | Walker | 210/794 |
| 4,627,923 | 12/1986 | Ross | 210/795 |
| 4,764,288 | 8/1988 | Walker et al. | 210/793 |

*Primary Examiner*—Ivars Cintins
*Attorney, Agent, or Firm*—Tipton L. Randall

[57] ABSTRACT

An improved method for maintaining a granular medium filter in a clean, operable condition is disclosed. The time interval required for the level of liquid above the filter bed to drain from a backwash outlet level to the upper bed surface level following a backwash cycle is monitored. Upon this measured draindown time exceeding a predetermined interval of time, a chemical cleaning cycle is initiated for the granular medium bed filter.

5 Claims, 2 Drawing Sheets

4,983,308

AUTOMATIC CHEMICAL CLEANING OF GRANULAR MEDIUM FILTERS

BACKGROUND OF THE INVENTION

1. Field of the Invention

This invention relates to an improved method for determining the necessity to chemically clean a granular medium filter bed.

2. Information Disclosure Statement

Granular medium bed filters often experience problems in filtering wastewaters containing greases and oils, or other deleterious materials, which coat the granular medium particles. These substances cause agglomeration of medium particles and retard the passage of liquid through the granular medium bed filters.

Various methods to clean the filter medium are known. In U.S. Pat. No. 3,932,278, Meidl et al. disclose cleaning sand or multi-medium filters with water containing high concentrations of chlorine or ozone.

In U.S. Pat. No. 4,032,443, Ross discloses removal of grease and oil from particulate bed granules by backwashing with a detergent.

U.S. Pat. No. 4,617,131 of Walker and U.S. Pat. No. 4,764,288 of Walker et al., disclose methods of backwashing and purging a filter bed to remove contaminants from the filter bed.

Regardless of how effective the cleaning method may be, if the cleaning cycle is not performed regularly, the granular medium of the filter bed can form "grease balls" or "mud balls" which are difficult to disperse. Unless cleaning is effective and regular, the granular medium of the filter bed may eventually cement together such that chemical cleaning cannot be performed effectively. Replacement of the dirty granular medium may even be required.

Thus it is desirable to perform the chemical cleaning cycle on a granular medium filter on a regular basis to prevent these problems from occurring. Conversely, it is unwise to expend excessive cleaner by cleaning the filter bed unnecessarily if not required for good filter performance. Excessive cleaning also reduces effective filtration time since the filter is off line during cleaning. Consequently, it is desirable to chemically clean a granular medium filter only when performance indicates that cleaning is necessary.

SUMMARY OF THE INVENTION

The present invention is an improved method for maintaining a granular medium filter in a clean, operable condition. The invention prevents the buildup of grease and oily material on the granular medium of the filter by monitoring the time interval required for the level of liquid above the filter bed to drain from a backwash outlet level to the upper bed surface level following a backwash cycle. As deleterious material accumulates on the granular medium, the time interval for liquid to drain from the backwash outlet level to the bed surface level increases. Upon this measured time interval exceeding a predetermined interval of time, a chemical cleaning cycle is initiated for the granular medium bed filter.

The measurement of the time interval is conveniently obtained by level switches located at the backwash outlet level and the filter bed level, both connected to a controller. Alternatively the time interval is measured by a continuous level sensor which is also connected to a controller.

DESCRIPTION OF THE PREFERRED EMBODIMENTS

The method of automatically initiating a chemical cleaning cycle for a granular medium filter according to this invention is illustrated with reference to the figures. Certain features of a typical filter adapted to practice the invention are shown in partial cross-section in FIG. 1. The filter shown is a pulsed-bed granular medium filter well known in the industry. The filter is merely representative of filters adaptable to chemical cleaning according to the present invention.

Figure 1:
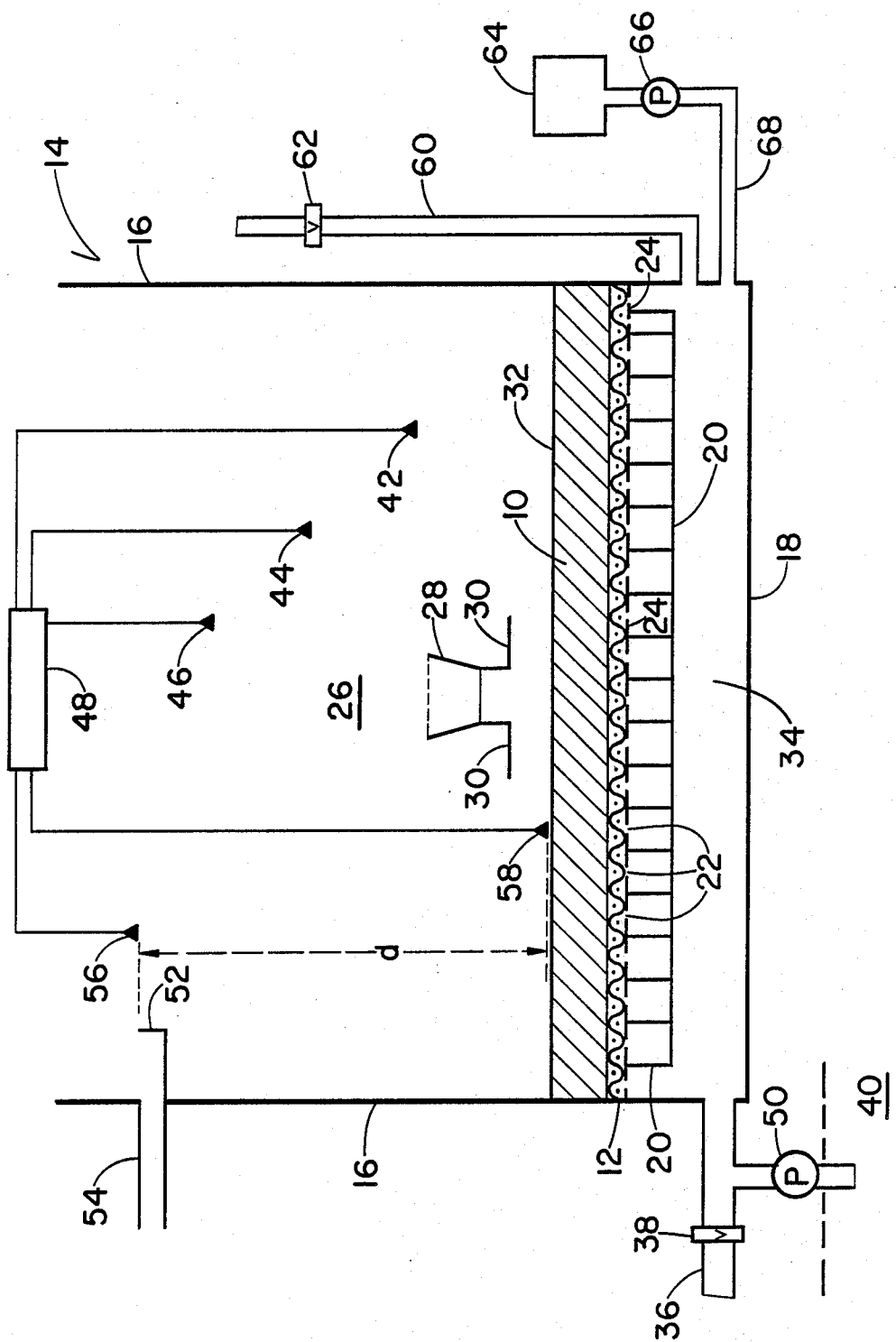
FIG. 1 is a side elevation view showing a granular medium filter to which the present invention may be applied.

In FIG. 1 a bed 10 of granular medium, such as sand, is supported on a screen 12 within a filter tank cell 14 having tank walls 16 and a tank bottom 18. An underdrain structure 20 supports the screen 12 and contains an array of orifices 22 in an underdrain plate 24 through which filtrate drains to an underdrain space.

Influent liquid to be filtered enters the head space 26 above filter bed 10 through a distribution trough 28 and overflows onto the splash plates 30 and to the upper filter bed surface 32. Solids suspended in the liquid are retained by the filter bed 10 and the filtered liquid passes down through the bed and through the apertures 22 into the underdrain cavity 34. The filtrate is discharged through a conduit 36, controlled by a valve 38, to final disposal or further treatment. A portion of the filtrate is retained in a clearwell 40, where it is stored for pulsing and backwashing the filter bed 10. As solids collect on and within the filter bed medium 10, the liquid head level above the bed upper surface 32 rises, activating, in turn, an air mix level sensor 42, a pulse mix sensor 44 and finally a backwash initiation sensor 46. These sensors are connected to a controller 48 which controls these cell operations. The air mix and pulse mix functions assist in extending the filtration run. The air mix creates currents in the liquid above the filter bed to suspend solids therein, while the pulse mix folds solids into the filter bed and presents a fresh bed surface to the liquid.

Activation of the backwash initiation sensor 46 initiates a backwash cycle for the filter cell. Influent flow to the filter cell ceases by closing off flow to the distribution trough 28. The underdrain outlet valve 38 closes and a backwash pump 50 brings filtrate from the clearwell 40 into the underdrain cavity 34. Backwash liquid flows up through the orifices 22 in the underdrain plate 24 and through the filter bed 10 at a fluidizing rate to flush particulate matter trapped in and on the surface of the granular medium out of the filter cell. Backwash flow fills the space 26 above the filter bed with liquid to the level of the backwash overflow weir 52 with backwash liquid overflowing the weir and exiting the filter cell by a conduit 54. The backwash cycle is generally controlled for a specific duration of time.

At the end of the backwash cycle, the pump 50 shuts off, stopping the upward fluidizing flow of backwash liquid. The granular medium settles down onto the screen 12 to form the filter bed, and the valve 38 opens allowing flow through the filter bed to commence. The liquid head level, maintained at the backwash overflow weir 54 during the backwash cycle, falls to the upper surface 32 of the filter bed during the drawdown of backwash water for the filter cell. The time at which the liquid head level begins to drop is sensed by a first level sensor 56, while the time at which the liquid level reaches the upper surface 32 of the filter bed is sensed by a second level sensor 58. The time interval required for the liquid head level to fall this distance, denoted as "d" in FIG. 1, is thus easily determined. Upon the measured time interval exceeding a predetermined duration of time, the controller 48 initiates a chemical cleaning cycle. This drawdown time determination must be made, however, without additional wastewater flowing into the filter cell.

Chemical cleaning of the filter bed material is performed following a backwash cycle where the maximum drawdown time has been exceeded. The flow of liquid into the filter cell was stopped for the backwash cycle. The liquid level has fallen to the upper bed surface 32 and now, rather than starting another filtration run, the liquid from the filter bed 10 is drained completely. The underdrain cavity 34, vented to the atmosphere by a conduit 60 fitted with a check valve 62, is also drained as completely as possible. This allows more accurate control of the concentration of cleaning solution, prepared as follows. Then underdrain outlet valve 38 closes and a predetermined amount of a chemical cleaning liquid, such as a detergent or surfactant, is pumped from a chemical cleaner storage tank 64 by a pump 66 via a conduit 68 into the underdrain cavity 34. Sufficient filtrate from the clearwell 40 is then delivered by the backwash pump 50 to the underdrain cavity 34, mixing with the cleaner and rising up through the underdrain structure and through the filter bed 10 to a level above the bed surface 32. A series of soak and pulse cycles are performed to clean the granular medium bed of the oil and grease which impedes filtering performance of the granular medium filter bed cell.

Figure 2:
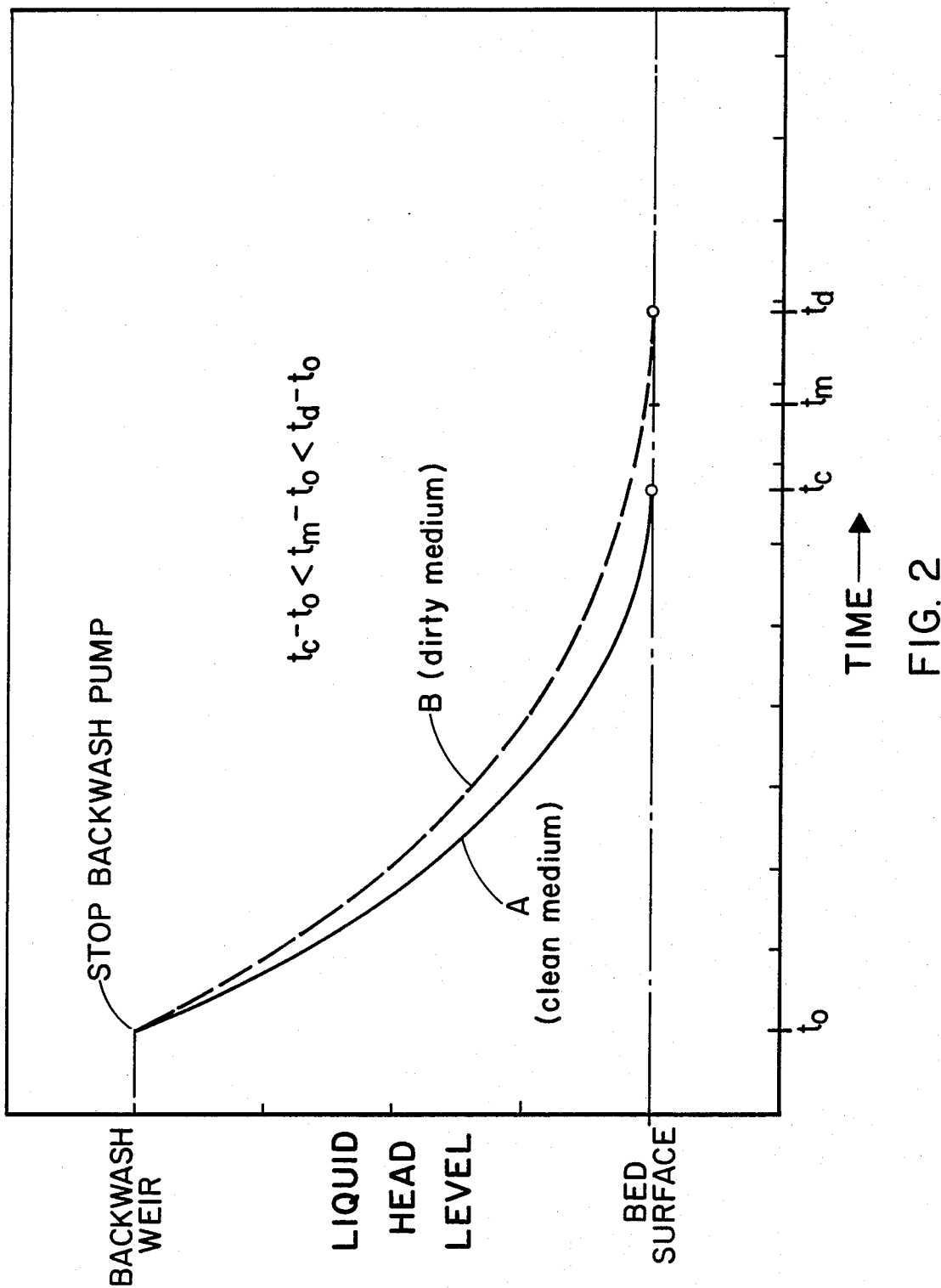
FIG. 2 is a graphical depiction of the fall of liquid head level above a granular medium filter bed following a backwash cycle.

Referring to FIG. 2, a plot of liquid head level versus time following a backwash cycle is shown. The liquid head level is maintained at the level of the backwash weir once the level rises to this overflow level during a backwash cycle. For a clean medium bed, as the backwash flow ceases, the liquid head level falls with time as seen in curve A. As the granular medium becomes greasy and oily during repeated filtration runs, the initial liquid head level drop following backwash does not change much compared to a clean granular medium. It is only as the liquid head level approaches the sand level that a significant difference is evident. In curve B the liquid head level decreases more slowly as it approaches the filter bed level compared to curve A, resulting in an extension of the time for the liquid head level to reach the filter bed upper surface.

In the process of this invention, a specified time interval, $t_m-t_o$, is selected as the maximum time of liquid head level drawdown without initiation of a chemical cleaning cycle. For a clean filter medium material the drawdown time, $t_c-t_o$, is less than the maximum time interval selected and no cleaning cycle is called for. This is shown in curve A. For a dirty filter medium material the drawdown time, $t_d-t_o$, is greater than the maximum specified time interval selected and a chemical cleaning cycle is initiated. This is shown in curve B.

The drawdown time for the filter cell of FIG. 1 is easily measured using the level sensors 56 and 58 which are connected to the filter cell controller 48. Alternatively, the drawdown time for the filter cell may be measured by a continuous level sensor, such as an ultrasonic fluid level measuring device located a some point above the level of the backwash overflow weir 52 in the filter cell. This device senses the start of the fall in liquid level from the top of the overflow weir until the end of the liquid level fall when it reaches the upper surface 32 of the filter bed.

From the above description, one skilled in the art can ascertain the essential characteristics of the invention and, without departing from the spirit and scope thereof, make various changes and modifications to adapt it to various usages.

I claim:

1. A process for automatically initiating a chemical cleaning cycle for a granular medium bed filter with upper and lower bed surfaces, said granular medium bed supported above an underdrain cavity, comprising the steps;
   (a) filtering a liquid through said granular medium bed by introducing liquid above said bed for downflow passage to said underdrain cavity to produce a filtrate, and further introducing liquid above said bed to raise the level of liquid above said bed to a backwash cycle initiating level;
   (b) backwashing said granular medium bed whereby said filtrate flows upwardly through said bed and out of said filter through a backwash outlet therein;
   (c) selecting a predetermined time interval required for the level of liquid above said filter bed to drain from said backwash outlet level to said upper bed surface level following a backwash cycle;
   (d) measuring by measuring means the time interval required for the level of liquid above said filter bed to drain from said backwash outlet level to said upper bed surface level following a backwash cycle; and
   (e) initiating a chemical cleaning cycle for said filter upon said measured time interval of step (d) exceeding said predetermined time interval of step (c).

2. A process according to claim 1 wherein said measuring means are level switches located at said backwash outlet level and at said upper bed surface level, said level switches connected to a controller for comparing said time interval of step (d) with said predetermined time interval of step (c).

3. A process according to claim 1 wherein said measuring means is an ultrasonic level sensor located above said backwash outlet level, said sensor connected to a controller for comparing said time interval of step (d) with said predetermined time interval of step (c).

4. A process according to claim 1 wherein said chemical cleaning cycle comprises draining said underdrain cavity, adding a predetermined amount of a chemical cleaner plus sufficient filtrate to said underdrain cavity to raise the level of cleaning solution thus formed to a level above said upper bed surface of said filter.

5. A process according to claim 4 wherein said chemical cleaner is a detergent or a surfactant.

* * * * *